United States Patent
Shin et al.

(10) Patent No.: US 11,112,489 B2
(45) Date of Patent: Sep. 7, 2021

(54) RADAR SYSTEMS AND METHODS HAVING ISOLATOR DRIVEN MIXER

(71) Applicant: Intel Corporation, Santa Clara, CA (US)

(72) Inventors: Woorim Shin, Portland, OR (US); Christopher Hull, Portland, OR (US); Stefano Pellerano, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 330 days.

(21) Appl. No.: 16/235,014

(22) Filed: Dec. 28, 2018

(65) Prior Publication Data

US 2020/0209349 A1 Jul. 2, 2020

(51) Int. Cl.
*G01S 7/03* (2006.01)

(52) U.S. Cl.
CPC .............. *G01S 7/036* (2013.01); *G01S 7/034* (2013.01); *G01S 7/038* (2013.01)

(58) Field of Classification Search
CPC ........... G01S 7/036; G01S 7/038; G01S 7/034
See application file for complete search history.

(56) References Cited

U.S. PATENT DOCUMENTS

| | | | |
|---|---|---|---|
| 5,315,303 A | 5/1994 | Tsou et al. | |
| 6,094,158 A | 7/2000 | Williams | |
| 9,246,202 B1 | 1/2016 | Barker et al. | |
| 10,644,715 B1 * | 5/2020 | Thibideau | H04B 3/50 |
| 2002/0153963 A1 * | 10/2002 | Kawanami | H01P 1/387 333/24.2 |
| 2005/0088336 A1 * | 4/2005 | Sakamoto | G01S 7/038 342/175 |
| 2005/0190101 A1 * | 9/2005 | Hiramatsu | H01P 1/38 342/175 |
| 2007/0164838 A1 * | 7/2007 | Iskander | H01P 1/19 333/161 |
| 2011/0299437 A1 | 12/2011 | Mikhemar et al. | |
| 2013/0106648 A1 * | 5/2013 | White | G01S 13/536 342/194 |
| 2014/0286204 A1 * | 9/2014 | Knox | H04L 12/66 370/278 |
| 2015/0333847 A1 * | 11/2015 | Bharadia | H04L 5/1461 455/63.1 |
| 2019/0319681 A1 * | 10/2019 | Natarajan | H04B 1/525 |
| 2020/0352622 A1 * | 11/2020 | Hancock | H01P 1/36 |

OTHER PUBLICATIONS

Serarch Report dated Dec. 12, 2019 for International Application No. PCT/US19/54059.

* cited by examiner

*Primary Examiner* — Erin F Heard
*Assistant Examiner* — Thomas M Hammond, III
(74) *Attorney, Agent, or Firm* — Schiff Hardin LLP (57) ABSTRACT

Radar circuitry can include an isolator and a mixer. The isolator can isolate a transmission signal path and a reception signal path from each other, and generate a mixing (e.g. oscillation) signal based on a transmission signal. The isolator can be coupled to the mixer such that the drive signal drives the mixer (e.g. serves as the local oscillation signal of the mixer). The mixer mixes a received signal and the drive signal to generate a converted signal (e.g. a down-converted signal). The isolator can be a hybrid transformer or electrically balanced duplexer.

13 Claims, 9 Drawing Sheets

RADAR SYSTEMS AND METHODS HAVING ISOLATOR DRIVEN MIXER

BACKGROUND

Field

Aspects described herein generally relate to radar systems and methods, including radar systems configured with a mixer driven by an isolator that isolates transmit and receive paths of the radar system. Aspects can also include wireless networks, wireless communications, and corresponding wireless communication devices implementing one or more radar systems of the present disclosure.

Related Art

Radar systems may use an isolator for Tx-to-Rx isolation, but require a large sized isolator having a fundamental limitation in Tx-to-Rx isolation because any reflection from Tx-to-Antenna is directly transferred to Antenna-to-Rx. Tx-to-Rx isolation is also limited by the finite return loss of the antenna port due to impedance mismatch.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Aspects described herein generally relate to radar systems and methods, including radar systems configured with a mixer driven by an isolator that isolates transmit and receive paths of the radar system. Aspects can also include wireless networks, wireless communications, and corresponding wireless communication devices implementing one or more radar systems of the present disclosure.

Exemplary aspects relate to radar systems and methods utilizing radar implementations configured to transmit and receive electromagnetic signals. The aspects of the present disclosure will be described with reference to radar systems configured for the millimeter wave (mmWave) spectrum (e.g., 24 GHz-300 GHz), but is not limited thereto. In an exemplary aspect, the radar system is a Continuous Wave (CW) radar system. In another aspect, the system is a Continuous Wave Frequency Modulated (CWFM) radar system. The aspects of the present disclosure can be applied to other radar technologies and spectrums as would be understood by one of ordinary skill in the relevant arts.

In exemplary aspects, a millimeter wave radar system can be configured to detect the location, distance, movement (e.g., speed, velocity, acceleration, direction of movement, etc.), orientation, and/or dimension(s) of an object.

Wireless communications are expanding into communications having increased data rates (e.g., from Institute of Electrical and Electronics Engineers (IEEE) 802.11a/g to IEEE 802.11n to IEEE 802.11ac and beyond). Currently, fifth generation (5G) cellular communications and Wireless Gigabit Alliance (WiGig) standards are being introduced for wireless cellular devices and/or Wireless Local Area Networks (WLAN).

Some aspects of the present disclosure relate to wireless local area networks (WLANs) and Wi-Fi networks including networks operating in accordance with the Institute of Electrical and Electronics Engineers (IEEE) 802.11 family of standards, such as the IEEE 802.11ac, IEEE 802.11ad and IEEE 802.11ay standards, the IEEE 802.11ax study group (SG) (named DensiFi) and Wireless Gigabit Alliance (WiGig). Other Aspects of the present disclosure pertain to mobile wireless communication devices such as the 4G and 5G cellular communication standards. The technical field more specifically pertains to radar systems and radar systems that can be implemented in communication systems.

Figure 1:
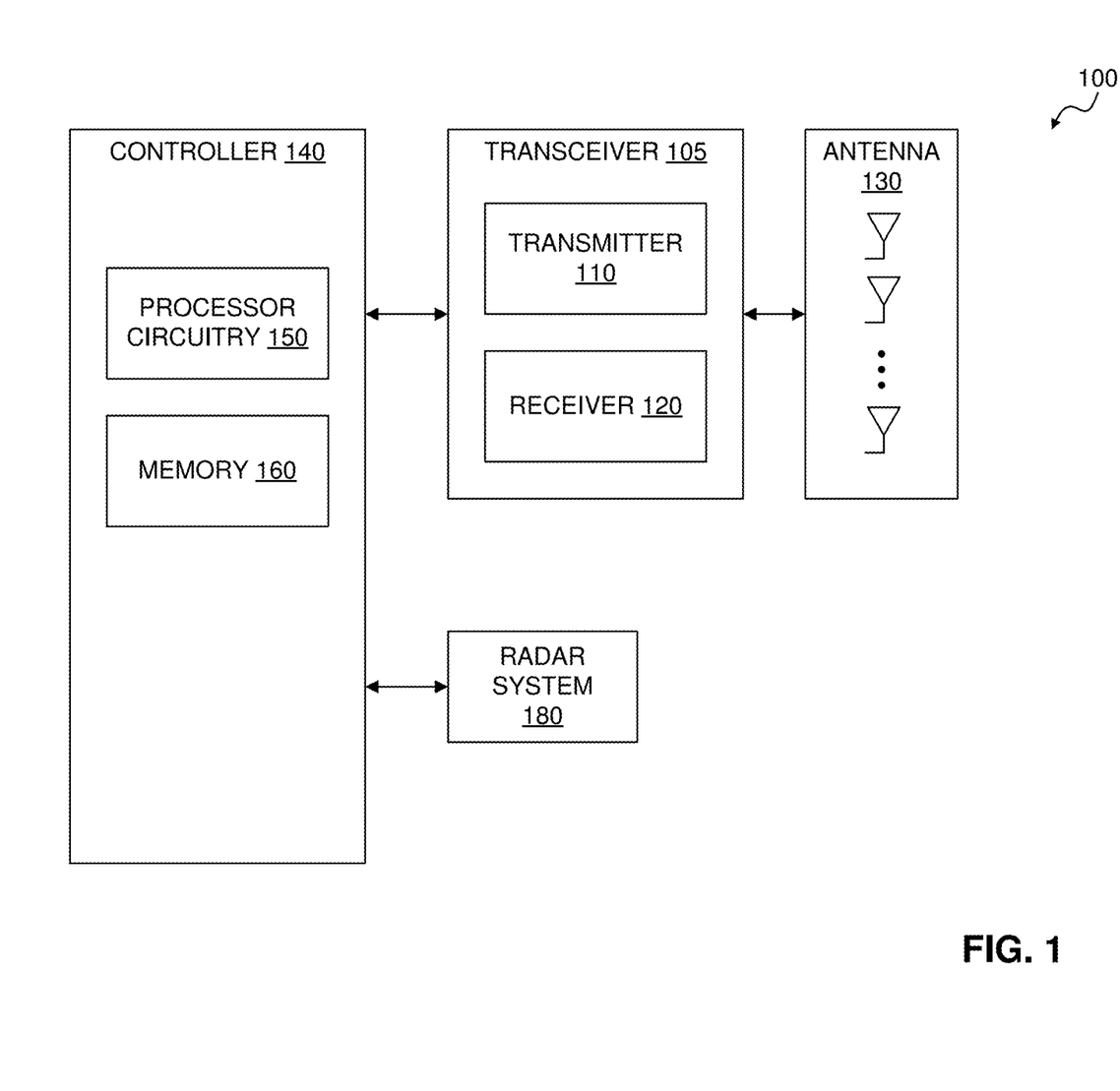
FIG. 1 illustrates a communication device having a radar system according to an exemplary aspects of the present disclosure.

FIG. 1 illustrates a communication device 100 according to an exemplary aspect of the present disclosure. The communication device 100 is configured to transmit and/or receive wireless communications based on one or more wireless technologies. For example, the communication device 100 can be configured for wireless communications conforming to, for example, one or more fifth generation (5G) cellular communication protocols, such as 5G protocols that use the 28 GHz frequency spectrum, and/or communication protocols conforming to the Wireless Gigabit Alliance (WiGig) standard, such as IEEE 802.11ad and/or IEEE 802.11ay that use the 60 GHz frequency spectrum. The communication device 100 is not limited to these communication protocols and can be configured for one or more additional or alternative communication protocols, such as one or more 3rd Generation Partnership Project's (3GPP) protocols (e.g., Long-Term Evolution (LTE)), one or more wireless local area networking (WLAN) communication protocols, and/or one or more other communication protocols as would be understood by one of ordinary skill in the relevant arts. For example, the communication device 100 can be configured to transmit and/or receive wireless communications using one or more communication protocols that utilize the millimeter wave (mmWave) spectrum (e.g., 24 GHz-300 GHz), such as WiGig (IEEE 802.11ad and/or IEEE 802.11ay) which operates at 60 GHz, and/or one or more 5G protocols using, for example, the 28 GHz frequency spectrum. In an exemplary aspect, the communication device 100 is configured for Multiple-input Multiple-output (MIMO) communications. In a MIMO operation, the communication device 100 may be configured to use multiple transmitting radio frequency (RF) chains (e.g. RF components and antennas) and/or multiple receiving RF chains for wireless communications, thereby increasing the capacity of the radio link.

The communication device 100 can be configured to communicate with one or more other communication devices, including, for example, one or more base stations, one or more access points, one or more other communication devices, and/or one or more other devices as would be understood by one of ordinary skill in the relevant arts.

The communication device 100 can include a controller 140 operably (e.g. communicatively) coupled to one or more transceivers 105. The communication device 100 can also include one or more radar systems 180. Exemplary aspects of the radar system 180 are described with reference to FIGS. 2-9.

The transceiver(s) 105 can be configured to transmit and/or receive wireless communications via one or more wireless technologies. The transceiver 105 can include processor circuitry that is configured for transmitting and/or receiving wireless communications conforming to one or more wireless protocols. For example, the transceiver 105 can include a transmitter 110 and a receiver 120 configured for transmitting and receiving wireless communications, respectively, via one or more antennas 130. In aspects having two or more transceivers 105, the two or more transceivers 105 can have their own antenna 130, or can share a common antenna via a duplexer. In an exemplary aspect, the transceiver 105 is configured to perform one or more radio frequency (RF) processing functions and/or baseband processing functions, such as media access control (MAC), encoding/decoding, filtering, modulation/demodulation (e.g. phase and/or amplitude modulation/demodulation), data symbol mapping, and/or error correction.

The antenna 130 can include one or more antenna elements forming an integer array of antenna elements. In an exemplary aspect, the antenna 130 is a phased array antenna that includes multiple radiating elements (antenna elements) each having a corresponding phase shifter. The antenna 130 configured as a phased array antenna can be configured to perform one or more beamforming operations that include generating beams formed by shifting the phase of the signal emitted from each radiating element to provide constructive/destructive interference so as to steer the beams in the desired direction. In an exemplary embodiment, two or more of the antenna elements of the antenna array are configured for wireless communication utilizing a MIMO configuration, and/or the communication device includes two or more antennas 130 configured for MIMO communications.

In an exemplary aspect, the controller 140 includes processor circuitry 150 that is configured to control the overall operation of the communication device 100, such as the operation of the transceiver(s) 105. The processor circuitry 150 can be configured to control the transmitting and/or receiving of wireless communications via the transceiver(s) 105. In an exemplary aspect, the processor circuitry 150 is configured to control the radar system 180 and/or perform one or more functions and/or operations of the radar system 180 to detect the location and movement characteristics (e.g. location, distance, speed, velocity, acceleration, direction of movement, orientation, and/or dimension(s)) of an object.

In an exemplary aspect, the processor circuitry 150 is configured to perform, alternatively or in cooperation with the transceiver 105, one or more radio frequency (RF) processing functions and/or baseband processing functions, such as media access control (MAC), encoding/decoding, filtering, modulation/demodulation (e.g. phase and/or amplitude modulation/demodulation), data symbol mapping, and/or error correction.

The processor circuitry 150 can be configured to run one or more applications and/or operating systems; power management (e.g., battery control and monitoring); display settings; volume control; and/or user interactions via one or more user interfaces (e.g., keyboard, touchscreen display, microphone, speaker, etc.).

The controller 140 can further include a memory 160 that stores data and/or instructions, where when the instructions are executed by the processor circuitry 150, controls the processor circuitry 150 to perform the functions described herein.

The memory 160 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 160 can be non-removable or removable, or a combination of both.

Examples of the communication device 100 include (but are not limited to) a mobile computing device (mobile device)—such as a laptop computer, a tablet computer, a mobile telephone or smartphone, a "phablet," a personal digital assistant (PDA), and mobile media player; a wearable computing device—such as a computerized wrist watch or "smart" watch, and computerized eyeglasses; and/or internet-of-things (IoT) device. In some aspects of the present disclosure, the communication device 100 may be a stationary communication device, including, for example, a stationary computing device—such as a personal computer (PC), a desktop computer, television, smart-home device, security device (e.g., electronic/smart lock), automated teller machine, a computerized kiosk, and/or an automotive/aeronautical/maritime in-dash computer terminal.

In one or more aspects, the communication device 100 (or one or more components of the communication device 100) can be additionally or alternatively configured to perform digital signal processing (e.g., using a digital signal processor (DSP)), modulation and/or demodulation (using a modulator/demodulator), a digital-to-analog conversion (DAC) and/or an analog-to-digital conversion (ADC) (using a respective DA and AD converter), encoding/decoding (e.g., using encoders/decoders having, for example, convolution, tail-biting convolution, turbo, Viterbi, and/or Low Density Parity Check (LDPC) encoder/decoder functionality), frequency conversion (using, for example, mixers, local oscillators, and filters), Fast-Fourier Transforms (FFT), preceding, and/or constellation mapping/de-mapping to transmit and/or receive wireless communications conforming to one or more wireless protocols, and/or facilitate beamforming scanning operations and/or beamforming communication operations. One or more of these functions can be performed to process radar information from (and/or provided to) the radar system 180.

The radar system 180 is configured to detect the location and movement characteristics (e.g. location, distance, speed, velocity, acceleration, direction of movement, orientation, and/or dimension(s)) of an object. This location and movement detection can be used to recognize a specific gesture, movement, and/or pattern of movement of an object (e.g., a person). The radar system 180 can include processor circuitry that is configured to detect the location of one or more nearby objects of the communication device 100.

Figure 2:
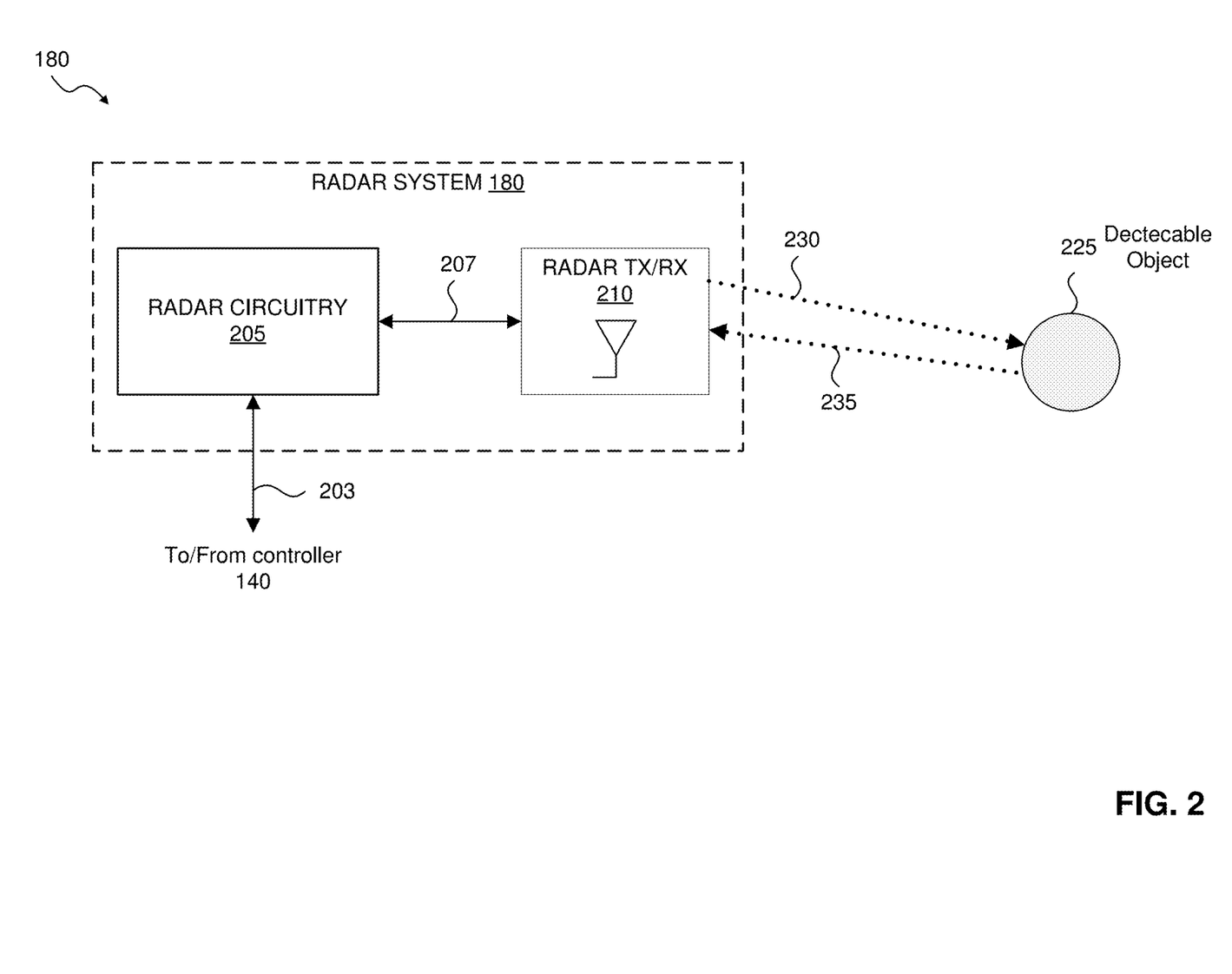
FIG. 2 illustrates a radar system according to exemplary aspects of the present disclosure.

Turning to FIG. 2, in an exemplary aspect, the radar system 180 includes radar circuitry 205 operably (e.g. communicatively) coupled to a radar antenna 210 via signal path 207. The radar circuitry 205 is operably coupled to the communication device 100 via signal path 203. The couplings between components can be wired and/or wireless.

Figure 3:
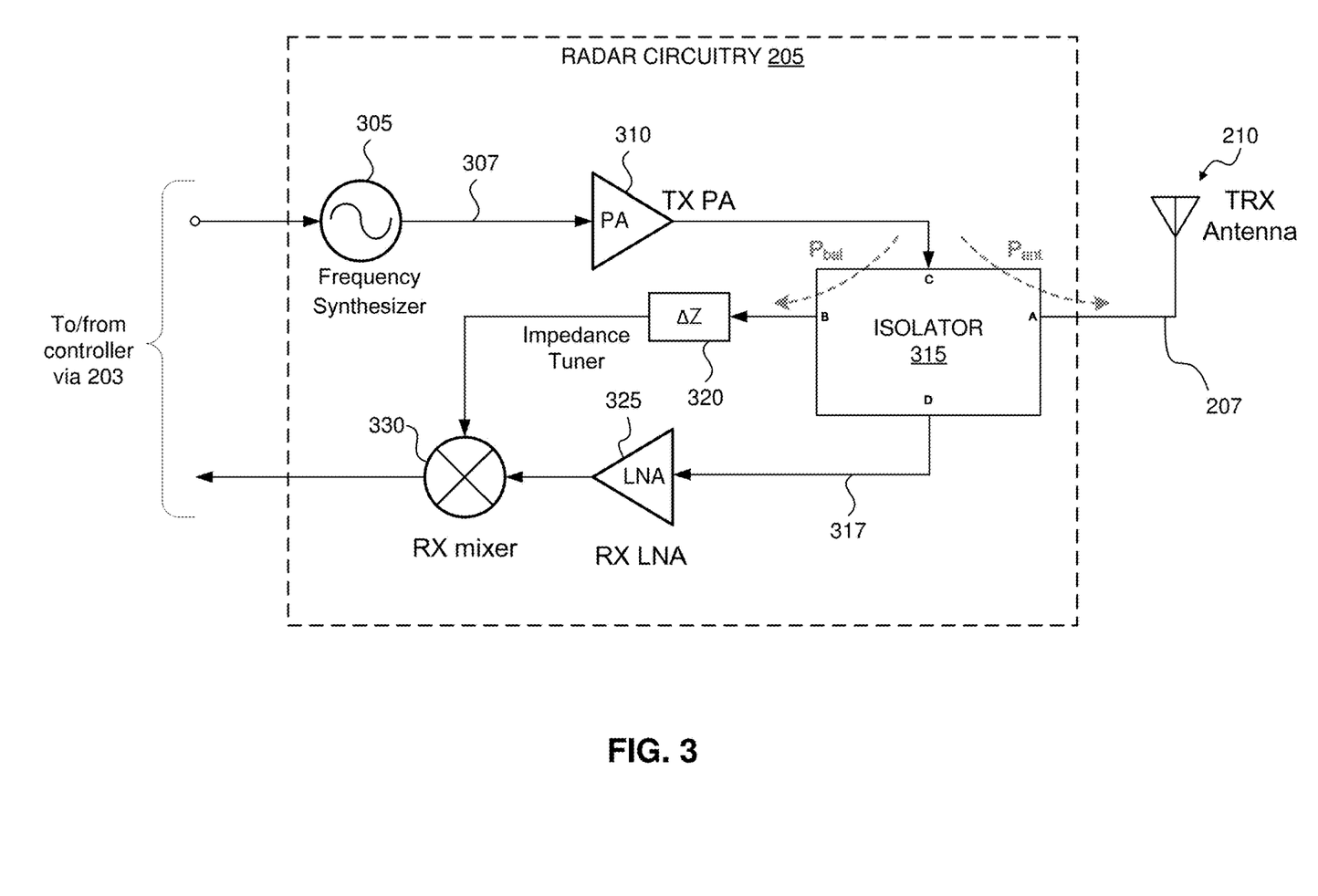
FIG. 3 illustrates a radar circuitry according to an exemplary aspect of the present disclosure.

In an exemplary aspect, the radar circuitry 205 includes a radar transceiver configured to transmit and/or receive radar signals via one or more radar technologies. The transceiver can include processor circuitry that is configured for transmitting and/or receiving radar signals. In an exemplary aspect, the transmitter and receiver of the radar transceiver share a common radar antenna 210 via a duplexer or isolator as shown in FIG. 3.

As an overview of radar systems and radar operation, a signal 230 is first radiated from an antenna of the system. The signal radiates outwardly in space until it encounters an object 225. The radiated wave is scattered (e.g. a portion of the radiation enters or is transmitted through the object and a portion 235 of the radiation is reflected by the object). The amount of radiated energy that is absorbed or transmitted through the object and how much radiated energy is reflected by the object depends on the characteristics of the object such as the size of the object, the shape of the object, and the material composition of the object. The radiated energy that is reflected back towards the transmitter can be referred to as back scatter. The reflected signal or scattered signal 235 is received by a receiver of the radar system and processed. This processing involves extraction of information from the reflected signal, including, for example, reflected power, range, frequency, Doppler information, and/or one or more other signal characteristics as would be understood by one of ordinary skill in the relevant arts.

As shown in FIG. 2, in an exemplary aspect, the radar system 180 is configured to radiate one or more radar signals 230 using antenna 210 and the echo or the reflected signal 235 produced by a target object 225 can be received via the antenna 210 and processed by the radar circuitry 205 to sense the object 225. In an exemplary aspect, the radar circuitry 205 is configured to emit low level radiation, such as low level radiation in a band that complies with Federal Communications Commission (FCC) or other federal governmental agency regulations (e.g., industrial, scientific, and medical radio band (ISM band) bands like 24 GHz or 61 GHz), but is not limited thereto and can be configured to emit higher level radiation in other aspects.

In an exemplary aspect, the radar circuitry 205 is configured to determine the nature of the echoed signal to determine information about the target including, for example, range, size of the target/object, material composition of the target/object, location and movement characteristics (e.g. location, distance, speed, velocity, acceleration, direction of movement, orientation, and/or dimension(s)), one or more physical and/or biological characteristics of the object (e.g. one or more properties of a person's skin, such as dielectric properties of the skin, skin depth, thickness of dermis and/or epidermis, hair thickness/width, hair follicle placement/pattern, hair color, skin color, pigment, skin texture, porosity structure of the skin, moisture level of the skin, skin blemishes (e.g. freckles, skin moles, etc.). This location and movement detection can be used to recognize a specific gesture, movement, and/or pattern of movement of an object (e.g., a person). In an exemplary aspect, the radar circuitry 205 is configured to detect the proximity of human tissue with respect to the communication device 100 based on one or more characteristics, such as the range, size of the target/object, material composition of the target/object, location and movement characteristics, and/or one or more physical and/or biological characteristics of the object.

The radar system 180 can be configured as a Continuous Wave (CW) radar system in one or more exemplary aspects. In an exemplary aspect, the radar system 180 is a Continuous Wave Frequency Modulated (CWFM) radar system instead of a CW radar system. The radar system 180 is not limited to CW and CWFM radar systems.

In an exemplary aspect, the radar system 180 is an electromagnetic radar system that is configured to transmit and receive signals (e.g., millimeter waves) in various frequencies and in various directions. The transmitted signal reaches the object(s) 225 being detected and is reflected back to a receiver. Radar circuitry 205 of the radar system 180 can be configured to measure the difference between the amplitude and/or phase of the transmitted signal 230 and the received signal 235. Based on these measurements, the radar system 180 is configured to determine locations, velocities (or other movement characteristics) with respect to the frequency.

In an exemplary aspect, the radar circuitry 205 is configured to generate one or more transmissions signal (e.g. chirps) and transmit the radar transmission signal via antenna 210 to one or more objects 225. The object(s) 225 may be moving or stationary. One or more of the signal(s) are reflected back to the radar system 180 and received via the antenna 210.

In an exemplary aspect, the radar circuitry 205 is configured to generate one or more baseband signals at one or more phases and/or gains, and determine phase and/or amplitude/gain differentiations (versus frequency) between transmitted signal(s) and received signal(s).

In an exemplary aspect, the radar circuitry 205 is configured to generate electromagnetic signals (e.g., in the millimeter wave length domain). The generated signals can be transmitted (radiated) using the antenna 210 and the echo (i.e. the reflected signal) produced by a target (e.g. object 225) can be received via the antenna 210 and sensed by the radar circuitry 205.

The radar circuitry 205 is configured to measure or otherwise determine phase and/or amplitude differences between the transmitted signals and the received signals to generate sensor information or other measurement data. The radar circuitry 205 is configured to provide the sensor information to controller 140. In an exemplary aspect, based on these measurements, the radar circuitry 205 determine locations, velocities or other movement characteristics. In an exemplary aspect, the radar circuitry 205 determine locations, velocities or other movement characteristics with respect to frequency.

In an exemplary aspect, the radar circuitry 205 determines radar information (e.g. the radar raw data) having a direct or an indirect relationship to the speed, velocity, direction, location, and/or distances of the object(s) 225. In an exemplary aspect, the radar circuitry 205 is configured to extract (or otherwise determine) the phase and/or amplitude (gain) differences between transmitted and returned signals. The differences can be stored in a memory (e.g. memory 160).

In an exemplary aspect, the radar circuitry 205 includes one or more processors, such as a digital signal processor. In an exemplary aspect, the processor(s) of the radar circuitry 205 are configured to process the phase and/or gain versus frequency that is measured and implement, for example, an Inverse fast Fourier transform (IFFT) on the samples. In this example, the output of the IFFT result may correspond to the distances of objects and/or other characteristics. In an exemplary aspect, the IFFT results can also provide information about multiple objects that are located in the same direction and allow for the objects to be distinguished from each other.

In an exemplary aspect, the radar system 180 is configured as a Continuous Wave Frequency Modulated (CWFM) system, and the radar information can include frequency values related to different distance, and/or configured as a Continuous Wave (CW) system in which the radar information can include frequency values related to the speed or velocity of the object. The radar system 180 is not limited to CWFM and CW systems and can be configured as one or more other radar systems as would be understood by one of ordinary skill in the art.

FIG. 3 illustrates radar circuitry 205 according to an exemplary aspect of the present disclosure. In an exemplary aspect, the radar circuitry 180 includes a transmission signal path 307 and a reception signal path 317 that are coupled to antenna 210 via an input/output (I/O) port A of isolator 315. In an exemplary aspect, the isolator 315 includes four ports A-D, where port A is an I/O port that is couplable to the antenna 210; port B coupled to an input of mixer 330; port C coupled to the transmission signal path; and port D coupled to the reception signal path 317. The signal path 307 and signal path 317 can be a wired and/or wireless signal paths.

In an exemplary aspect, the transmission signal path 307 includes a frequency synthesizer 305 and a power amplifier (PA) 310. The frequency synthesizer 305 is configured to generate one or more output signals having respective one or more frequencies based on an input signal having a (e.g. reference) frequency. The frequency synthesizer 305 can be configured to perform frequency multiplication, frequency division, direct digital synthesis, frequency mixing, and/or one or more other techniques to generate the one or more frequency signals as would be understood by one of ordinary skill in the art. The frequency synthesizer 305 can include one or more phase-locked loops that are configured to generate the one or more output frequency signals based on the input frequency.

The frequency synthesizer 305 generates an output signal having a frequency that is based on the frequency (e.g. reference frequency) of an input signal, such as a frequency chirp control signal. The frequency of the output signal can be adjusted by the frequency synthesizer 305 to produce an output signal with a variable frequency.

Figure 4:
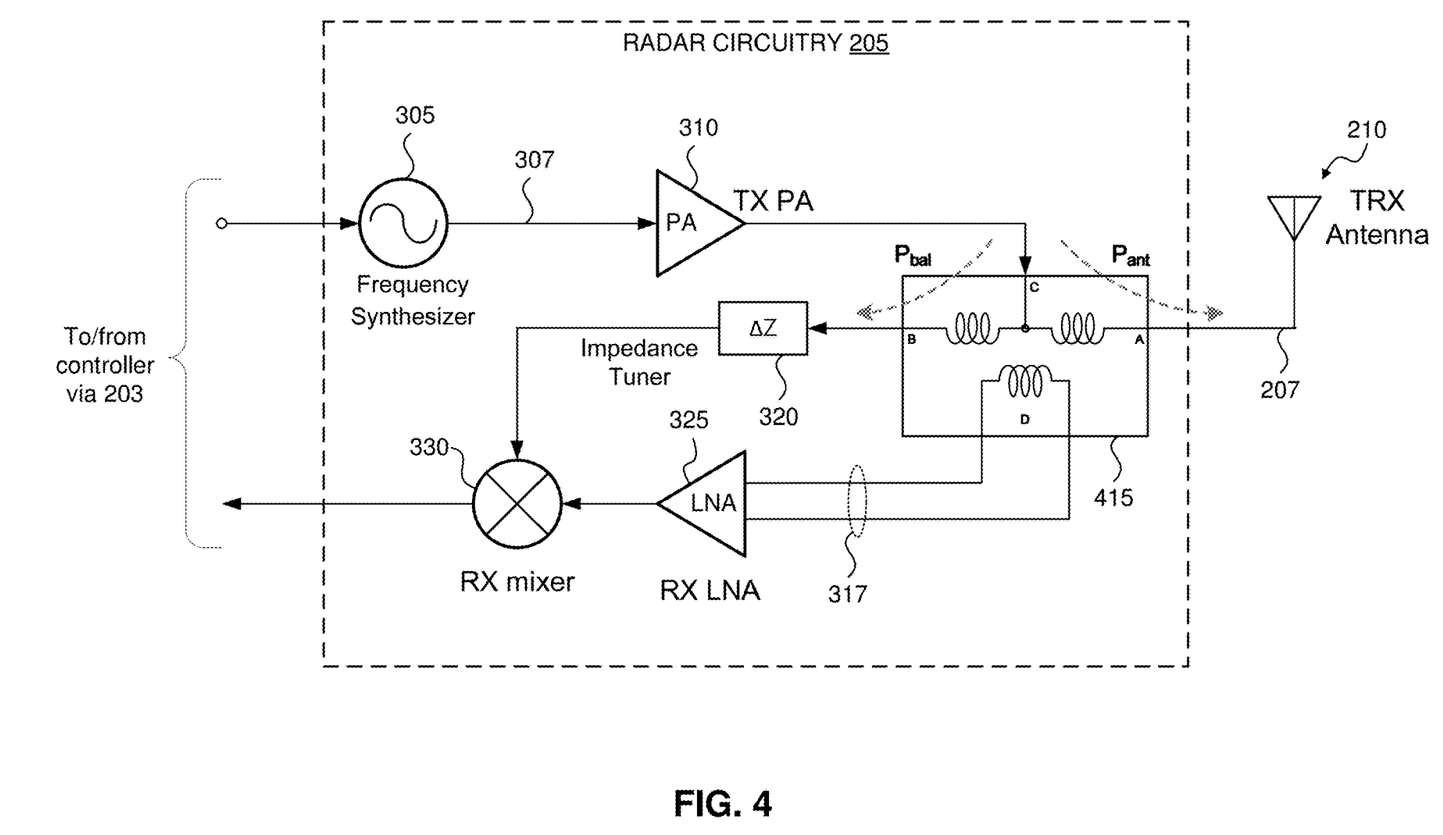
FIG. 4 illustrates a radar circuitry according to an exemplary aspect of the present disclosure.
Figure 6A:
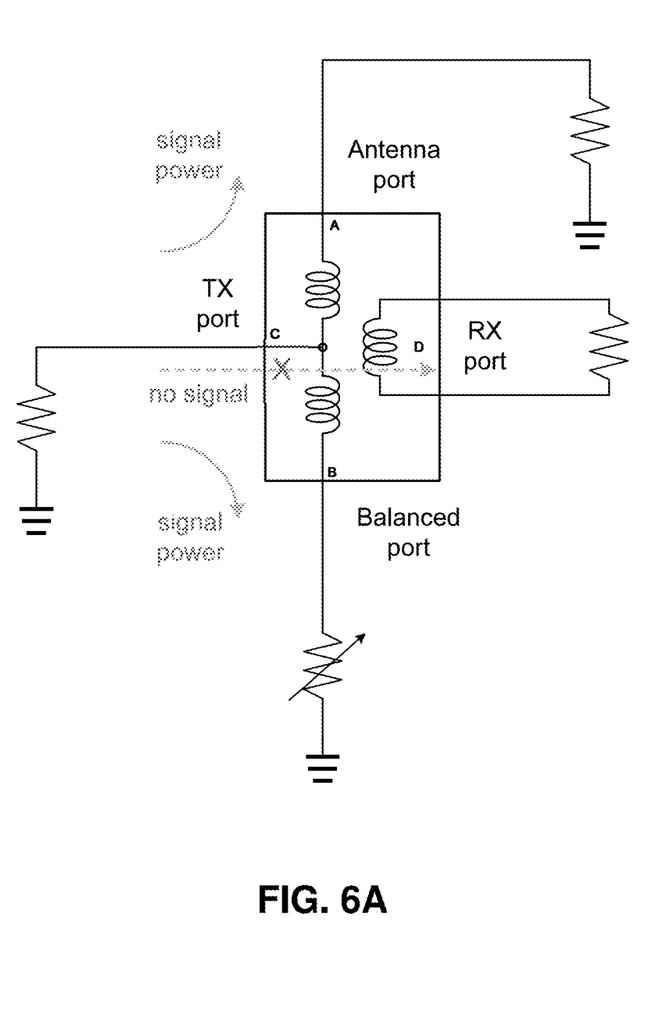
FIGS. 6A-6B illustrate the operation of a hybrid transformer isolator according to exemplary aspects of the present disclosure.
Figure 6B:
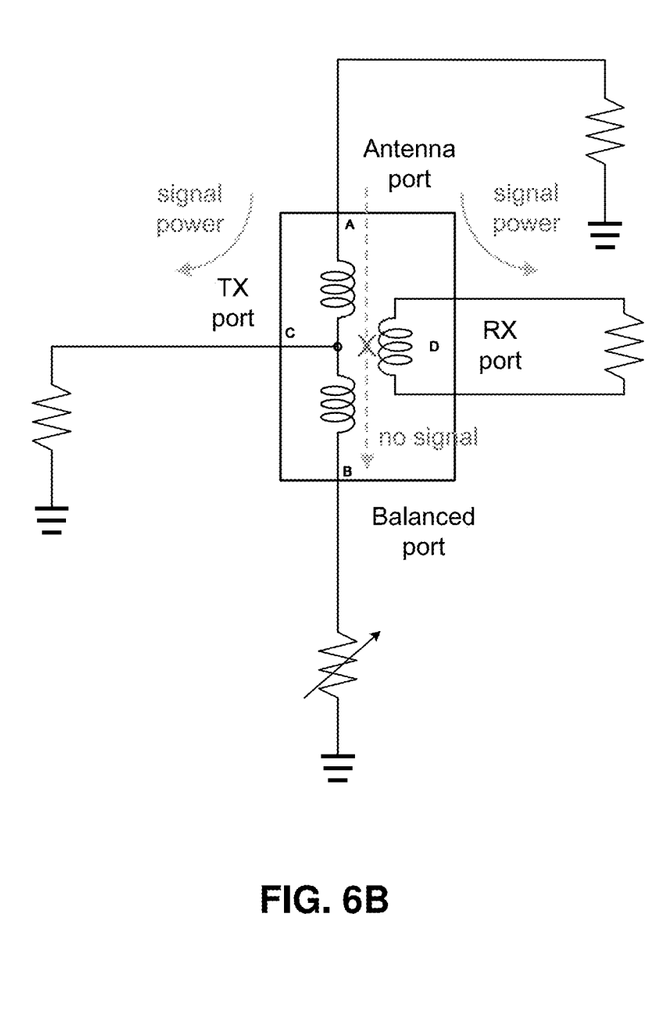

In an exemplary aspect, the frequency synthesizer 305 includes processor circuitry that is configured to generate one or more frequencies based on an input (e.g. reference) frequency. In an exemplary aspect, the input (reference) frequency is provided from an external or internal reference clock, such as a crystal oscillator. In an exemplary aspect, the controller 140 is configured to control the frequency synthesizer 305 to adjust the frequency of the output signal and/or provide the reference clock signal to the frequency synthesizer. The one or more signals generated by the frequency synthesizer 305 are provided as an input to power amplifier 310, which is configured to amplify the input frequency signal to generate an amplified signal. The amplified signal is then provided to the isolator 315 (e.g. at port C). The amplified signal is then split by the isolator 315 into two signals $P_{bal}$ and $P_{ant}$ and provided to ports B and A, respectively. When the impedance is balanced at ports B and A, the power of the amplified signal is equally split between the two signals $P_{bal}$ and $P_{ant}$. In an exemplary aspect, the isolator 315 includes analog circuitry, digital circuitry, or a combination of both, that is configured to realize one or more functions and/or operations of the isolator 315. In an exemplary aspect, the isolator 315 is an electrically balanced duplexer or a hybrid transformer 415 as shown in FIG. 4. The operation of the hybrid transformer is illustrated in FIGS. 6A and 6B. For example, with reference to FIG. 6A, during a signal transmission, a signal on the transmission signal path (Port C) is split between the antenna 210 connected to the I/O (antenna) port A, and port B (e.g. balanced port), while port D (reception signal path) is isolated from the transmission signal path at port C. That is, with impedance matching between ports A and B, the transmission signal from the transmission signal path (port C) is split between the antenna port A (I/O port) and the balanced port B (i.e. port coupled to the mixer 330) while isolating the reception port D. During signal reception, as shown in FIG. 6B, the signal received by the antenna 210 on port A (I/O port) is split between the transmission signal path (port C) and the reception signal path (port D). The balanced port B is isolated from the antenna port A.

In an exemplary aspect, the reception port D is connected to a low-noise amplifier (LNA) 325 that is configured to amplify the signal output from port D of the isolator 315 (e.g. a signal received by the radar circuitry 205 via the antenna 210) without significantly degrading the signal-to-noise ratio of the amplified signal. The output signal for the LNA 325 is provided to mixer 330. The mixer 330 is configured to mix (e.g. down-convert) the amplified signal from the LNA 325 based on a local oscillation (LO) input to the mixer 330. In an exemplary aspect, the balanced port B of the isolator 315 is connected to the LO input of the mixer 330 such that the portion of the amplified signal ($P_{bal}$) from the isolator 315 functions as the LO input signal of the mixer 330. Advantageously, in aspects of the present disclosure, the transmission power delivered to the balanced port B drives the mixer 330 to mix (down-convert) a signal received by the radar circuitry 205, which increase power efficiency. A further advantage is that no additional LO distribution network (and power) is needed for down converting received signals, thereby increasing the power efficiency of the radar circuitry 205 while reducing the circuit size of the radar circuitry.

In an exemplary aspect, the radar circuitry 205 includes an impedance tuner 320 that is configured to adjust the impedance at the balanced port (i.e. port B) to match the input impedance of the antenna 210 at port A. Advantageously, the matching of impedances improves isolation of the isolator 315. In an exemplary aspect, the impedance tuner 320 includes processor circuitry that is configured to adjust the impedance at the balanced port (i.e. port B) to match the input impedance of port A (e.g. input impedance of the antenna 210). In an exemplary aspect, the impedance tuner 320 includes a switchable resistor-capacitor (RC) network.

Figure 5:
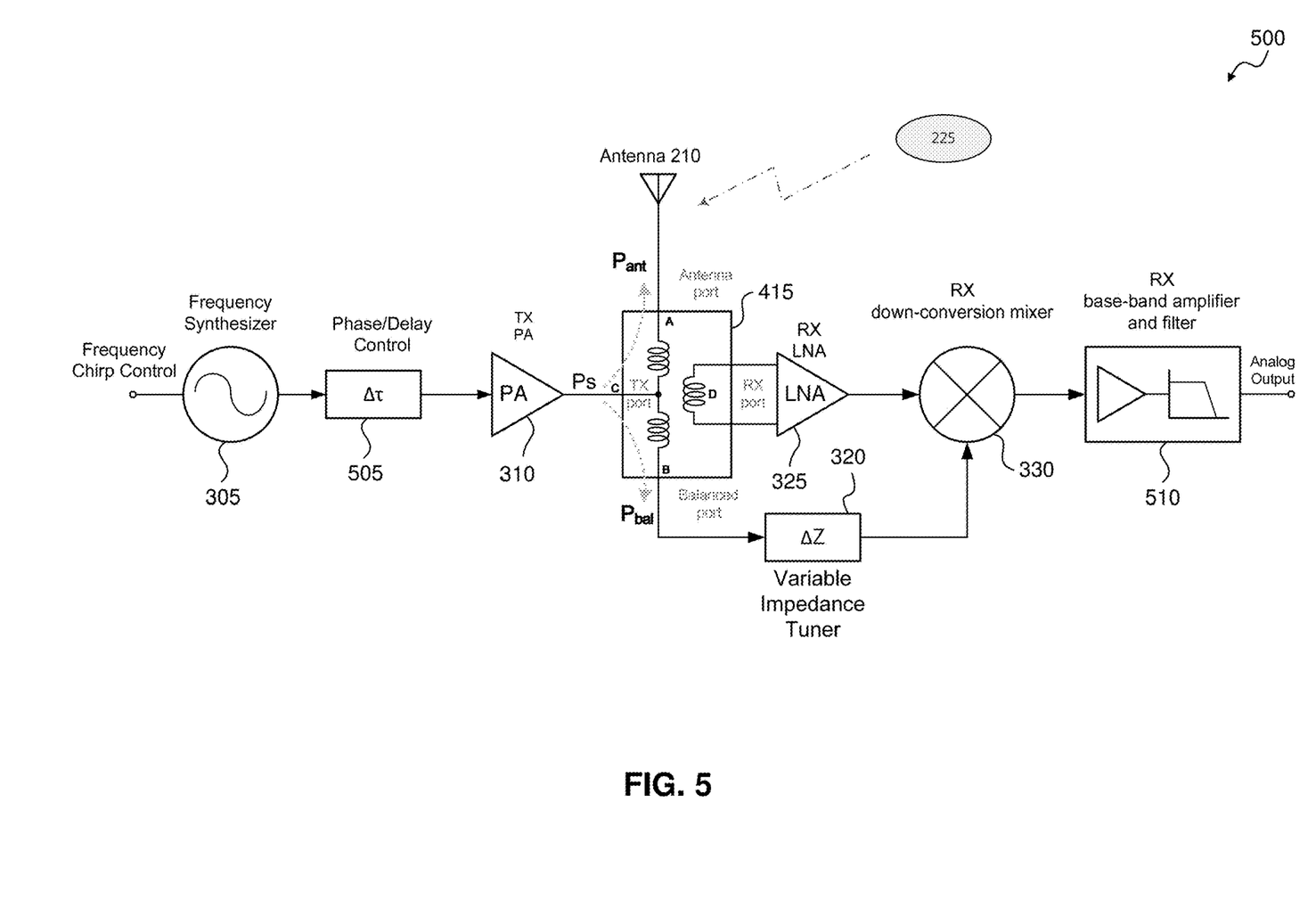
FIG. 5 illustrates a radar circuitry according to an exemplary aspect of the present disclosure.

FIG. 5 illustrates radar circuitry 500 according to an exemplary aspect of the present disclosure. The radar circuitry 500 is similar to the radar circuitry 205 discussed with reference to FIGS. 3 and 4, but additionally includes a phase/delay controller 505 and an amplifier and filter 510.

The phase/delay controller 505 is configured to adjust the delay of an input signal (e.g. the output signal generated by the frequency synthesizer 305) to obtain an output signal with a desired phase. The phase/delay controller 505 may also be referred to as phase shifter 505. In an exemplary aspect, the phase/delay controller 505 includes processor circuitry that is configured to adjust the delay of an input signal to obtain an output signal with a desired phase. The phase/delay controller 505 can be configured for beamforming/beam-steering operations by the radar circuitry.

In an exemplary aspect, because the mixer 330 is driven based on a portion of the transmission signal due to the splitting function of the isolator 315/415, a delay adjust/phase shift applied to the transmission signal is also applied to the down-conversion of a received signal by the mixer 330. Advantageously, the need for an additional phase-shifting process (and corresponding circuitry) on the reception signal path is therefore avoided because the receiving local oscillation is phase shifted consistent with the phase shift applied to the transmission signal on the transmission signal path by the phase/delay controller 505.

The amplifier and filter 510 is configured to filter and/or amplify an input signal (e.g. the output signal of the mixer 330) to generate a filtered and/or amplified output signal. In an exemplary aspect, the amplifier and filter 510 is a baseband amplifier and filter. In an exemplary aspect, the amplifier and filter 510 includes processor circuitry that is configured to filter and/or amplify an input signal to generate a filtered and/or amplified output signal.

Advantageously, because the portion of the transmission signal drives the mixer 330, the radar circuitry of the exemplary aspects of the present disclosure avoid additional on-chip local oscillator routing. Further, the exemplary aspects reduce antenna reflections realized by conventional 3-port isolators that suffer from non-zero transmitter-to-receiver leakage even with perfect isolator performance. In particular, the isolator 315/415 advantageously reduces or avoids antenna reflection as transmitter-to-receiver isolation is dependent on the balance between the antenna port A and balanced (e.g. mixer) port B.

With a single antenna interface (e.g. I/O port A) and isolator 315/415, exemplary aspects advantageously achieve a radar transceiver with high-linearity, compact layout size (e.g. reduced form factor) while provided sufficient isolation between the transmitter and receiver, and improved power efficiency. Further, the exemplary aspects realize the following advantages: Two-dimensional (e.g. x- and y-dimensions) phased array radar is enabled with improved scalability (e.g. elements can be repeated to form large arrays); for a given antenna array aperture or number of elements (e.g. given area on the system allocated for the antenna array), the single-antenna interface allows for two times the antenna elements for both transmission and reception as they both use the entire antenna array; and for a given antenna array aperture, the achievable resolution is two times better than separate antenna solution (e.g. two times narrower beam width can be realized)

Figure 7:
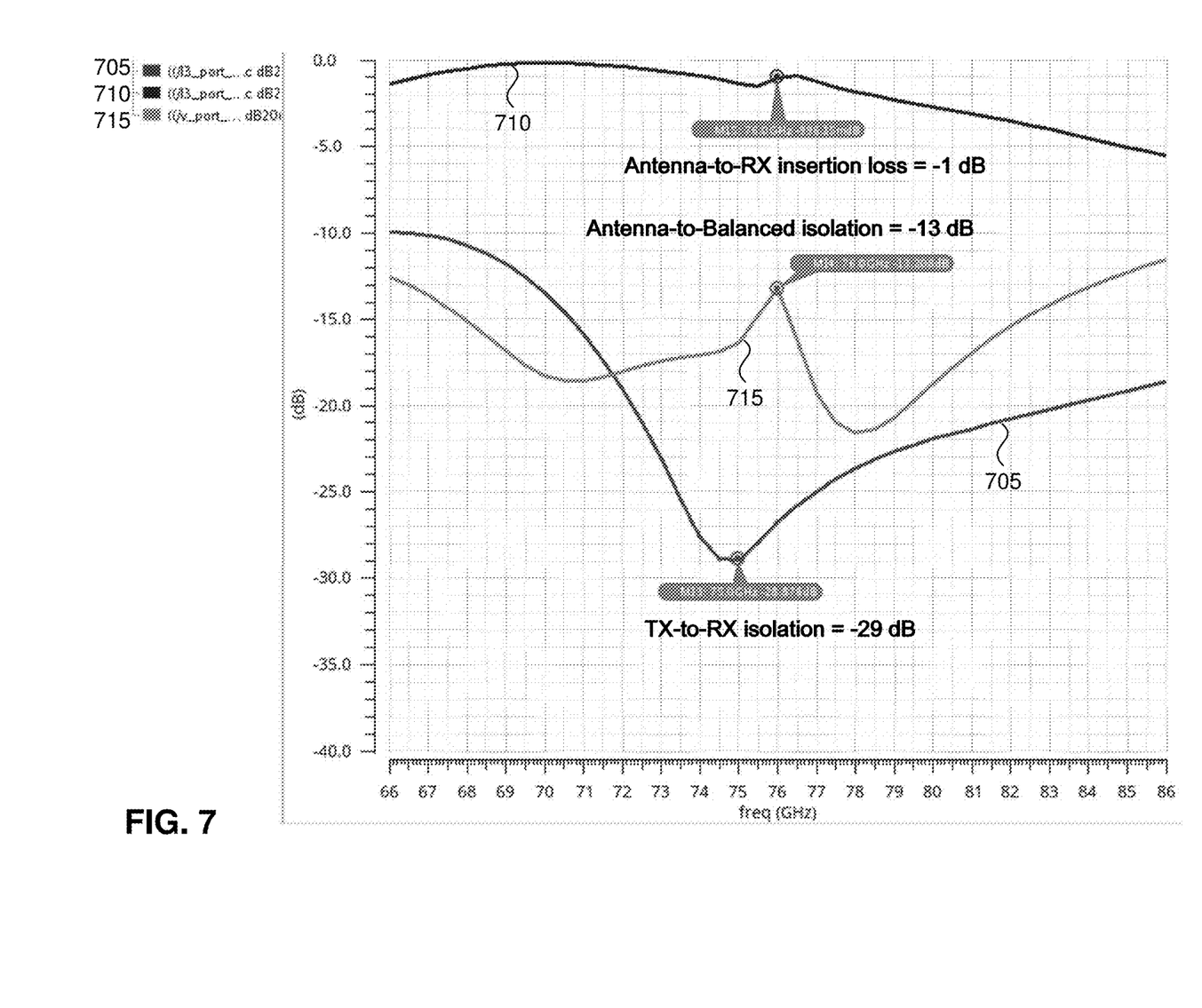
FIGS. 7-8 illustrate performance plots of radar circuitry according to exemplary aspects of the present disclosure.
Figure 8:
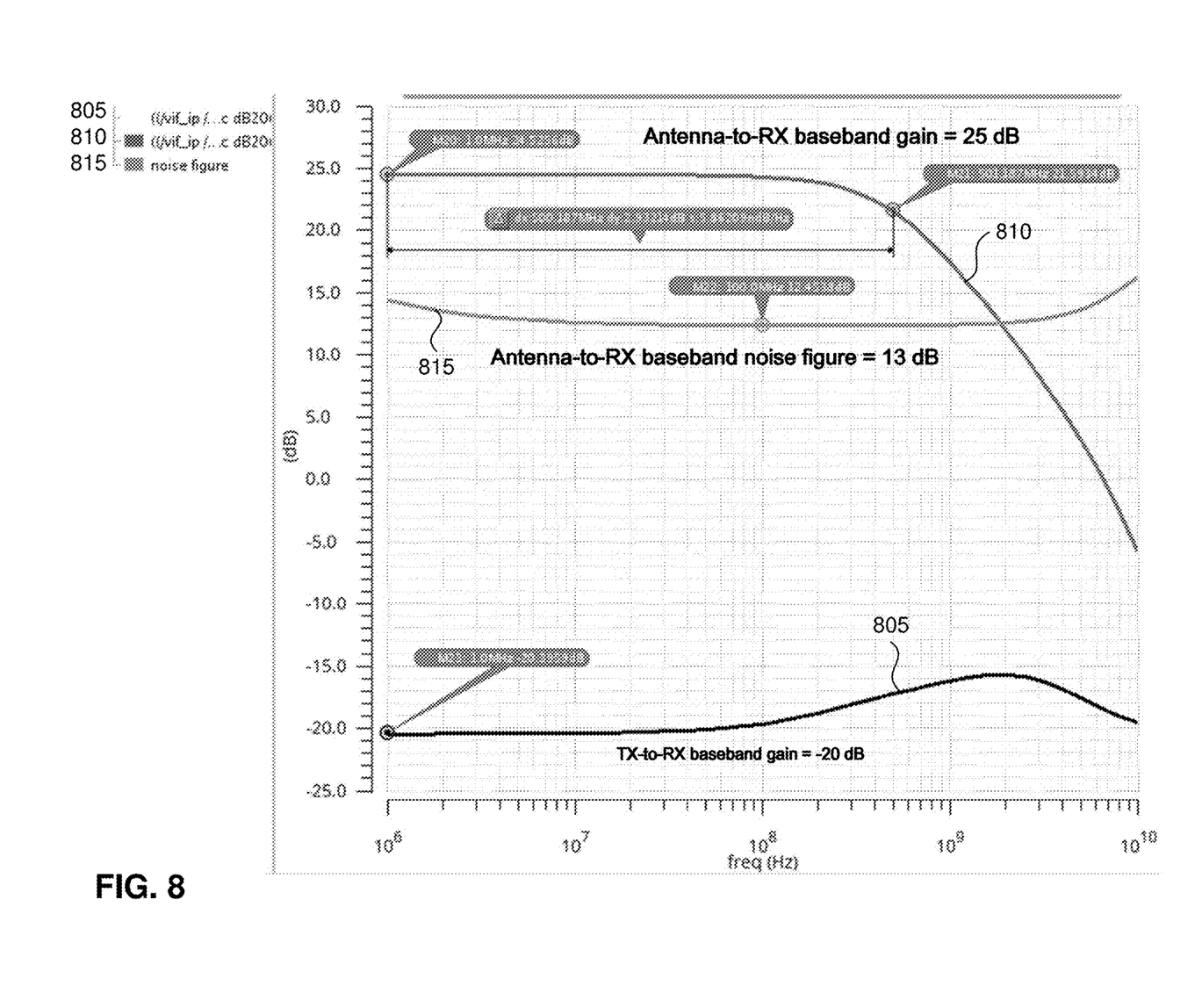

FIGS. 7-8 illustrate performance plots of the radar circuitry according to exemplary aspects of the present disclosure. In particular, FIG. 7 includes the transmitter-to-receiver isolation 705, antenna-to-receiver insertion loss 710, and antenna-to-balanced isolation 715. FIG. 8 includes the transmitter-to-receiver baseband gain 805, antenna-to-receiver baseband gain 810, and antenna-to-receiver baseband noise 815.

Figure 9:
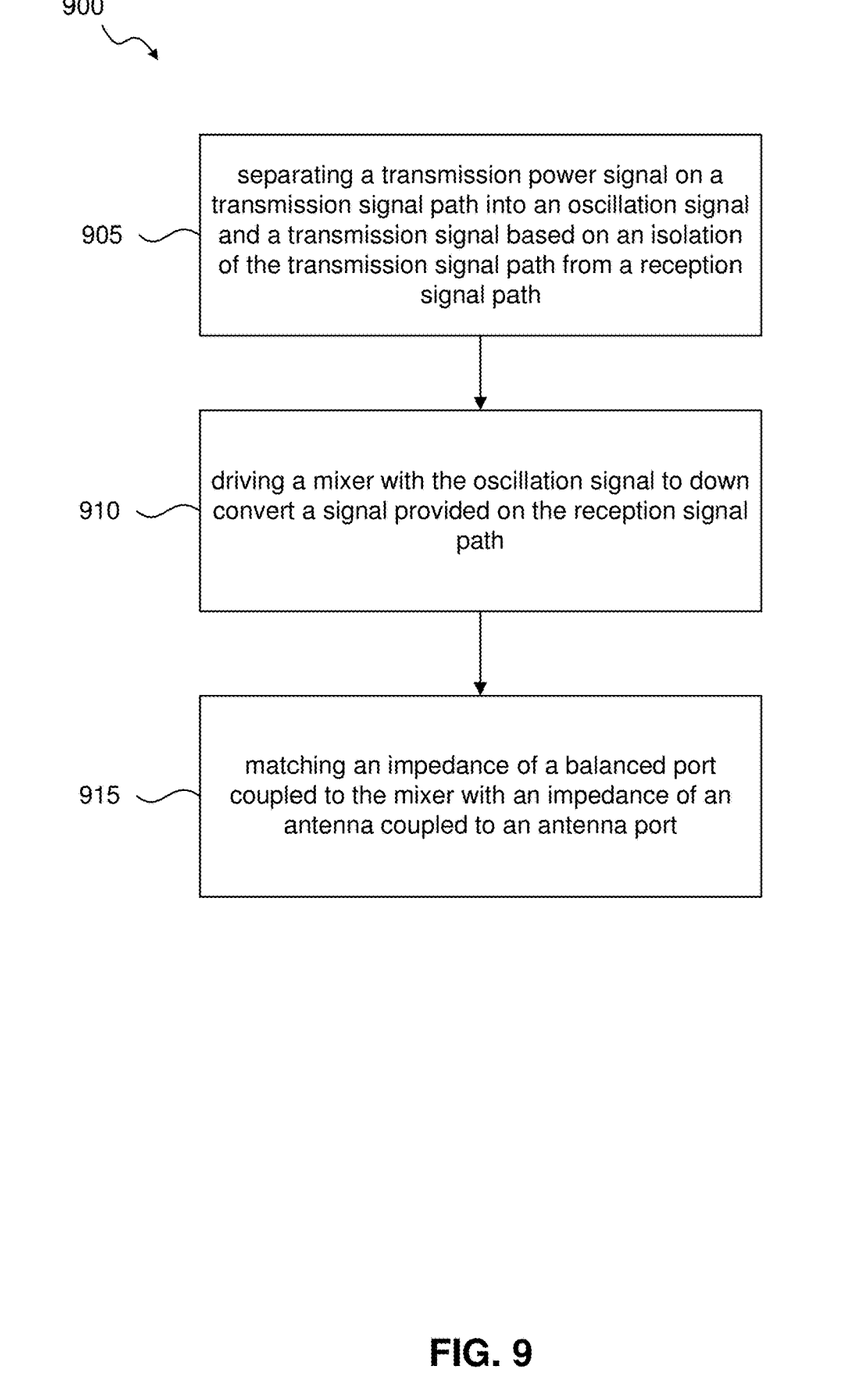
FIG. 9 illustrates a flowchart of a radar isolation method according to exemplary aspects of the present disclosure.

FIG. 9 illustrates a flowchart 900 of a radar signal processing method according to an exemplary aspect of the present disclosure. The flowchart 900 is described with continued reference to FIGS. 1-8. The operations of the methods are not limited to the order described below, and the various operations may be performed in a different order. Further, two or more operations of the methods may be performed simultaneously with each other. In an exemplary aspect, the radar circuitry 205/500 is configured to perform the method of flowchart 900.

The method of flowchart 900 begins at operation 905, where a transmission power signal on a transmission signal path is separated into an oscillation signal ($P_{bal}$) and a transmission signal ($P_{ant}$) based on an isolation of the transmission signal path from a reception signal path. In an exemplary aspect, isolator 315/415 is configured to isolate the transmission signal path from the reception signal path.

After operation 905, the flowchart 900 transitions to operation 910, where an oscillation signal ($P_{bal}$) is provided to mixer 330 to drive the mixer 330 to down convert a signal provided on the reception signal path. In an exemplary aspect, the isolator 315/415 is coupled to the LO input of the mixer 330 such that the oscillation signal ($P_{bal}$) is the oscillation signal of the mixer 330.

After operation 910, the flowchart 900 transitions to operation 915, where an impedance of a balanced port (i.e. the output of the isolator 315/415 that generates the oscillation signal ($P_{bal}$)) that is coupled to the mixer 330 is matched with an impedance of an antenna coupled to an antenna port (I/O port). In an exemplary aspect, the impedance tuner 320 is configured to adjust the impedance at the balanced port (i.e. port B) to match the input impedance of the antenna 210 at port A.

EXAMPLES

Example 1 is radar circuitry, comprising: an isolator configured to: isolate a transmission signal path and a reception signal path from each other; and generate a drive signal based on a transmission signal on the transmission signal path; and a mixer configured to mix a received signal on the reception signal path and the drive signal to generate a converted signal.

Example 2 is the subject matter of Example 1, wherein the isolator is a hybrid transformer.

Example 3 is the subject matter of Example 1, wherein the isolator is an electrically balanced duplexer.

Example 4 is the subject matter of any of Examples 1-3, wherein the isolator is coupled to the mixer.

Example 5 is the subject matter of any of Examples 1-4, wherein the isolator is further configured to couple the transmission signal path and the reception signal path to an input/output (I/O) port.

Example 6 is the subject matter of Example 5, further comprising an antenna coupled to the I/O port, wherein the received signal is received via the antenna.

Example 7 is the subject matter of any of Examples 1-4, wherein the isolator is further configured to couple the transmission signal path and the reception signal path to an input/output (I/O) port and couple the transmission signal path to the mixer.

Example 8 is the subject matter of any of examples 5-7, wherein the isolator is configured to split the transmission signal to generate the drive signal provided to the mixer and an output signal provided to the I/O port.

Example 9 is the subject matter of any of Examples 1-8, further comprising an impedance tuner that is configured to adjust an impedance of a port of the isolator coupled to the mixer at which the drive signal is provided.

Example 10 is the subject matter of any of Examples 1-8, further comprising an impedance tuner that is configured to adjust an impedance of a port of the isolator from which the drive signal is provided and that is coupled to the mixer to match an impedance of the antenna.

Example 11 is the subject matter of any of Example 1-10, wherein the transmission signal path comprises a phase shifter configured to adjust a phase of the transmission signal, wherein the drive signal generated by the isolator has a same phase as the adjusted phase of the transmission signal.

Example 12 is the subject matter of any of Examples 1-11, wherein the mixer down converts the received signal based on the drive signal to generate the converted signal.

Example 13 is radar circuitry, comprising: a hybrid transformer configured to: isolate a transmission signal path and a reception signal path from each other; couple the transmission signal path and the reception signal path to an input/output (I/O) port; and separate a transmission power signal into a local oscillation signal and a transmission signal; and a mixer coupled to the hybrid transformer and configured to receive the local oscillation signal and mix a signal received via the I/O port and provided to the mixer via the reception signal path with the local oscillation signal to generate a converted signal.

Example 14 is the subject matter of Example 13, wherein the transmission signal path is coupled to the mixer by the hybrid transformer.

Example 15 is the subject matter of any of Examples 13-14, further comprising an impedance tuner that is configured to adjust an impedance of a port of the isolator coupled to the mixer at which the local oscillation signal is provided.

Example 16 is the subject matter of any of Examples 13-14, further comprising an impedance tuner that is configured to adjust an impedance of a port of the isolator from which the local oscillation signal is provided and that is coupled to the mixer to match an impedance of the antenna at the I/O port.

Example 17 is the subject matter of any of Examples 13-16, further comprising an antenna coupled to the I/O port, wherein the received signal is received via the antenna.

Example 18 is the subject matter of any of Examples 13-17, wherein the mixer down converts the received signal based on the local oscillation signal to generate the converted signal.

Example 19 is radar circuitry, comprising: an isolating means for isolating a transmission signal path and a reception signal path from each other, and for generating a drive signal based on a transmission signal on the transmission signal path; and mixing means for mixing a received signal on the reception signal path and the drive signal to generate a converted signal.

Example 20 is the subject matter of Example 19, wherein the isolating means is a hybrid transformer.

Example 21 is the subject matter of Example 19, wherein the isolating means is an electrically balanced duplexer.

Example 22 is the subject matter of any of Examples 19-21, wherein the isolating means is coupled to the mixing means.

Example 23 is the subject matter of any of Examples 19-22, wherein the isolating means couples the transmission signal path and the reception signal path to an input/output (I/O) port.

Example 24 is the subject matter of Example 23, further comprising an antenna coupled to the I/O port, wherein the received signal is received via the antenna.

Example 25 is the subject matter of any of Examples 19-22, wherein the isolating means couples the transmission signal path and the reception signal path to an input/output (I/O) port and couple the transmission signal path to the mixing means.

Example 26 is the subject matter of any of examples 23-25, wherein the isolating means splits the transmission signal to generate the drive signal provided to the mixing means and an output signal provided to the I/O port.

Example 27 is the subject matter of any of Examples 19-26, further comprising impedance tuning means for adjusting an impedance of a port of the isolating means coupled to the mixing means at which the drive signal is provided.

Example 28 is the subject matter of any of Examples 19-26, further comprising impedance tuning means for adjusting an impedance of a port of the isolating means from which the drive signal is provided and that is coupled to the mixing means to match an impedance of the antenna.

Example 29 is the subject matter of any of Example 19-28, wherein the transmission signal path comprises phase shifting means for adjusting a phase of the transmission signal, wherein the drive signal generated by the isolating means has a same phase as the adjusted phase of the transmission signal.

Example 30 is the subject matter of any of Examples 19-29, wherein the mixing means down converts the received signal based on the drive signal to generate the converted signal.

Example 31 is radar circuitry, comprising: a hybrid transforming means for isolating a transmission signal path and a reception signal path from each other, for coupling the transmission signal path and the reception signal path to an input/output (I/O) port, and for separating a transmission power signal into a local oscillation signal and a transmission signal; and mixing means coupled to the hybrid transforming means, and for receiving the local oscillation signal and for mixing a signal received via the I/O port and provided to the mixing means via the reception signal path with the local oscillation signal to generate a converted signal.

Example 32 is the subject matter of Example 31, wherein the transmission signal path is coupled to the mixing means by the hybrid transforming means.

Example 33 is the subject matter of any of Examples 31-32, further comprising impedance tuning means for adjusting an impedance of a port of the isolating means coupled to the mixing means at which the local oscillation signal is provided.

Example 34 is the subject matter of any of Examples 31-32, further comprising impedance tuning means for adjusting an impedance of a port of the isolating means from which the local oscillation signal is provided and that is coupled to the mixing means to match an impedance of the antenna at the I/O port.

Example 35 is the subject matter of any of Examples 31-34, further comprising an antenna coupled to the I/O port, wherein the received signal is received via the antenna.

Example 36 is the subject matter of any of Examples 31-35, wherein the mixing means down converts the received signal based on the local oscillation signal to generate the converted signal.

Example 37 is a radar signal processing method, comprising: isolating a transmission signal path and a reception signal path from each other to separate a transmission power signal on the transmission signal path into an oscillation signal and a transmission signal; and providing the oscillation signal to a mixer via a signal path to drive the mixer with the oscillation signal to convert a signal provided on the reception signal path.

Example 38 is the subject matter of Example 37, wherein the transmission signal path and the reception signal path are coupled to an input/output (I/O) signal path by an isolator, the method further comprising matching respective impedances of the signal path and the I/O signal path.

Example 39 is a non-statutory computer-readable medium comprising program instructions, when executed, cause a processor to perform the method of any of Examples 38-39.

Example 40 is a radar system comprising means for performing the operations of the method of any of Examples 38-39.

Example 41 is a wireless communication device comprising the radar circuitry of any of Examples 1-36.

Example 42 is an apparatus substantially as shown and described.

Example 43 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, other structural electronic hardware, or a combination thereof. A processor includes a microprocessor, a digital signal processor (DSP), central processing unit (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry may include memory that stores data and/or instructions. The memory may be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to communication protocols that utilize the millimeter wave (mmWave) spectrum (e.g., 24 GHz-300 GHz), such as WiGig (IEEE 802.11ad and/or IEEE 802.11ay) which operates at 60 GHz, and/or one or more 5G protocols using, for example, the 28 GHz frequency spectrum. The exemplary aspects can be applied to other wireless communication protocols/standards (e.g., LTE or other cellular protocols, other IEEE 802.11 protocols, etc.) as would be understood by one of ordinary skill in the relevant arts.

What is claimed is:

1. A radar circuitry, comprising:
an isolator configured to:
isolate a transmission signal path and a reception signal path from each other; and
generate a drive signal at a balanced port of the isolator based on a transmission signal on the transmission signal path that is received at a transmission signal port of the isolator;
a mixer configured to mix a received signal on the reception signal path and the drive signal to generate a converted signal,
wherein during signal transmission, the transmission signal on the transmission signal path is split between the balanced port and a common antenna port of the isolator, and
wherein during signal reception, the received signal that is received via the common antenna port is split between the transmission port and a receiving port of the isolator that is coupled to the reception signal path; and an impedance tuner configured to adjust an impedance of the balanced port to match an input impedance of a common antenna that is coupled to the isolator via the common antenna port, the isolation provided between the transmission signal path and the reception signal path being dependent on the impedance matching between the balanced port and the common antenna port.

2. The radar circuitry of claim 1, wherein the isolator is a hybrid transformer.

3. The radar circuitry of claim 1, wherein the isolator is an electrically balanced duplexer.

4. The radar circuitry of claim 1, wherein the isolator is coupled to the mixer.

5. The radar circuitry of claim 1,
wherein the balanced port of the isolator is coupled to the mixer.

6. The radar circuitry of claim 1, wherein the isolator is further configured to couple the transmission signal path and the reception signal path to the common antenna port.

7. The radar circuitry of claim 6,
wherein the received signal is received via the common antenna.

8. The radar circuitry of claim 7, wherein the impedance tuner is coupled to the mixer.

9. The radar circuitry of claim 1, wherein the mixer down converts the received signal based on the drive signal to generate the converted signal.

10. The radar circuitry of claim 1, wherein the isolator is further configured to couple the transmission signal path and the reception signal path to the common antenna port and to couple the transmission signal path to the mixer.

11. The radar circuitry of claim 10, wherein the isolator is configured to split the transmission signal to generate the drive signal provided to the mixer and an output signal provide to the common antenna port.

12. The radar circuitry of claim 1, wherein the transmission signal path comprises a phase shifter configured to adjust a phase of the transmission signal, and
wherein the drive signal generated by the isolator has a same phase as the adjusted phase of the transmission signal.

13. The radar circuitry of claim 1, wherein the transmission signal on the transmission signal path comprises an amplified transmission power signal, and
wherein the power of amplified transmission power signal is equally split between the balanced port and the common antenna port of the isolator when the impedance tuner adjusts the impedance of the balanced port to match the input impedance of the common antenna.

* * * * *